(12) United States Patent
Wilson et al.

(10) Patent No.: US 6,376,818 B1
(45) Date of Patent: Apr. 23, 2002

(54) MICROSCOPY IMAGING APPARATUS AND METHOD

(75) Inventors: Tony Wilson, Oxford; Mark Andrew Aquilla Neil, Botley; Rimvydas Juskaitis, Oxford, all of (GB)

(73) Assignee: Isis Innovation Limited, Oxford (GB)

( * ) Notice: Subject to any disclaimer, the term of this patent is extended or adjusted under 35 U.S.C. 154(b) by 0 days.

(21) Appl. No.: 09/410,614

(22) Filed: Oct. 1, 1999

Related U.S. Application Data

(63) Continuation-in-part of application No. PCT/GB98/00988, filed on Apr. 3, 1998.

(51) Int. Cl.[7] .............................................. G01B 11/06
(52) U.S. Cl. .............................. 250/201.3; 250/201.7; 356/609; 359/558
(58) Field of Search ...................... 250/201.3, 201.7, 250/201.8, 559.21; 356/609, 610; 359/558, 566, 569, 577; 382/106, 285

(56) References Cited

U.S. PATENT DOCUMENTS

| | | |
|---|---|---|
| 5,151,609 A * | 9/1992 | Nakagawa et al. ...... 250/201.7 |
| 5,381,236 A | 1/1995 | Morgan |
| 5,513,275 A | 4/1996 | Khalaj et al. |
| 6,188,478 B1 * | 2/2001 | Fuchs et al. ................ 356/381 |
| 6,239,909 B1 * | 5/2001 | Hayashi et al. ............. 359/569 |

FOREIGN PATENT DOCUMENTS

| | | |
|---|---|---|
| WO | WO 96/34365 | 10/1996 |
| WO | WO 97/06509 | 2/1997 |

OTHER PUBLICATIONS

M. Gruber, G. Häusler, Simple Robust and Accurate Phase Measuring Triangulation, OPTIK, vol. 89, No. 3, Jan. 1, 1992, pp. 118–122.

* cited by examiner

*Primary Examiner*—Stephone Allen
(74) *Attorney, Agent, or Firm*—Sterne, Kessler, Goldstein & Fox PLLC

(57) ABSTRACT

An object is illuminated by a light source, and a periodic pattern of transparent and non-transparent stripes is superimposed onto the object. At least three images are recorded at different spatial phases of the pattern by means of a microscope of shallow focal depth, and a three-dimensional image containing only in-focus detail is then derived from the recorded images.

20 Claims, 5 Drawing Sheets

MICROSCOPY IMAGING APPARATUS AND METHOD

This application is a continuation-in-part of PCT/GB98/00988 filed Apr. 3, 1998.

BACKGROUND OF THE INVENTION

1. Field of the Invention

The present invention relates to microscopy imaging apparatus and an imaging method, for generating an image which generally contains only in-focus detail and a method thereof. The present invention is suited to generating images which may be used to create in-focus three-dimensional images of volume structures.

2. Related Art

With a conventional light microscope three-dimensional structures cannot be successfully imaged. The resultant image consists of a sharp image of an in-focus region of a three-dimensional structure as well as defocused images of the structures above and below the in-focus region. A conventional light microscope is unable to reject out-of-focus detail.

Confocal microscopes have been developed which optically section a three-dimensional structure to provide in-focus images of individual layers or strata of the structure which can be subsequently combined to form an in-focus three-dimensional image of the complete volume structure. Unfortunately, the light budget of confocal microscopes is generally poor when incoherent light sources are used. Laser scanning confocal microscopes can achieve a very shallow depth of focus, but require expensive apparatus and an illuminating/imaging pinhole through which the laser light must be focused.

In U.S. Pat. No. 5,381,236 an optical sensor is described which is used to determine the range (distance) of individual features of a three-dimensional structure. The sensor has a periodic patterned light source which illuminates the structure and is reversible (i.e. the pattern is phase shifted 180°). An array of detector elements which are aligned to the pattern of the light source is used to detect an image of the pattern and the reversal of the pattern illuminating the structure. As the pattern will only be imaged well on those parts of the structure which are themselves in focus, this enables the range (distance) of in-focus parts of the structure to be determined. The apparatus and method described in U.S. Pat. No. 5,381,236 has the disadvantage that in order to work the individual elements of the detector must be exactly aligned with and matched to the pattern of the light source. In practice this has been found to be almost impossible to achieve.

SUMMARY OF THE INVENTION

The present invention seeks to provide microscopy imaging apparatus and an imaging method to produce images which, in a similar way to confocal images, comprise substantially only in-focus detail and which can be used to create a three-dimensional image of a structure through optical sectioning of the structure. The present invention achieves the optical sectioning without the need for precise alignment or matching of detector and pattern components and provides at the same time a favourable light budget.

In one aspect, the present invention provides a method of generating an image of a specimen from three or more recorded images of the specimen, each recorded image having superimposed thereon a substantially periodic spatial pattern, the spatial phase of the pattern in at least three recorded images of the specimen being different; the method comprising grouping the recorded images into pairs of images and calculating the square root of (the sum of the squares of the differences between the recorded images in each pair of images), thereby to remove the spatial pattern and obtain an in-focus image.

In another aspect, the present invention provides a method of generating an image of a specimen comprising the steps of illuminating the specimen with a light source; generating a substantially periodic spatial pattern on the specimen; recording a first image of the specimen; altering the spatial phase of the pattern on the specimen and recording a second image of the specimen; repeating at least once more the step of altering the spatial phase of the pattern on the specimen and recording a third image of the specimen, the spatial phase of the pattern in at least three recorded images of the specimen being different; and analysing the three or more recorded images of the specimen to remove the spatial pattern from the images thereby to generate an optically sectioned image of the specimen.

While the identified prior art relies on a matched detector grid aligned to stringent requirements with the mask pattern, the present invention is of advantage in that the need for such a matched detector grid is eliminated. Processing of image data is simple and the invention enables production of optically sectioned images from a conventional microscope in real time.

The analysis suitably comprises grouping the recorded images into pairs of images and calculating the square root of the sum of the squares of the differences between the recorded images in each pair of images, thereby to remove the spatial pattern and obtain an in-focus image. In one embodiment of the invention the analysis comprises removing the pattern using the formula:

$$I = \sqrt{\sum_{n,m} (I_n - I_m)^2}$$

wherein the recorded images are $I_{n,m}$ and the in-focus image is I. Thus, where there are three recorded images the in-focus image can be calculated from the formula:

$$I = \sqrt{(I_1-I_2)^2+(I_1-I_3)^2+(I_2-I_3)^2}$$

Where there are four recorded images the analysis can use different symmetrical pairs of images, such as (i) images 1 and 2; 2 and 3; 3 and 4; and 4 and 5 or (ii) images 1 and 3; and 2 and 4, and thus the formula can be:

$$I = \sqrt{(I_1-I_3)^2+(I_2-I_4)^2}$$

or:

$$I = \sqrt{(I_1 - I_2)^2 + (I_2 - I_3)^2 + (I_3 - I_4)^2 + (I_4 - I_1)^2}$$

Following this principle, the recorded images are separated into pairs of images, or into symmetrical subsets of pairs of images, and analyzed according to the invention. Thus, it is not necessary for all possible pairs of images to be used in calculating the in-focus image, and the in-focus image can be calculated from just one subset of pairs.

In a preferred embodiment the method of the invention is repeated at different focal positions to produce an in-focus three-dimensional image of the specimen. In a specific embodiment of the invention, described in detail below, a three-dimensional image of the surface texture of a specimen is thereby obtained.

The spatial phase of the pattern may be altered continuously or in discrete steps. Where the spatial phase is altered continuously, the recorded images of the specimen are integrated over a predetermined time period. It has been calculated and also confirmed in practice that high quality images are obtained when the spatial phase of the pattern is continuously altered. Thus, a wide range of means for altering the spatial phase are of application to the present invention.

In a further aspect, the present invention provides a method of processing image data of at least three images of the same specimen, the images having a substantially periodic pattern superimposed thereon, the spatial phases of the pattern on three images being different, comprising analysing the data so as to generate a composite image, free of the pattern.

In a still further aspect, the present invention provides microscopy imaging apparatus comprising a light source; patterning means for generating a substantially periodic spatial pattern; focusing means for focusing light from the light source on a specimen and generating the pattern on the specimen; phase shift means for adjusting the spatial phase of the pattern generated on the specimen; a detector for detecting images of the specimen; and an analyzer having means for analysing images of the specimen, the spatial phase shift of the pattern being different in at least three images, and means for removing the spatial pattern from the three images of the specimen thereby to generate an optically sectioned image of the specimen.

Preferably, the patterning means is in the form of a mask having one-dimensional local periodicity and the mask pattern is projected onto the specimen. For example, the mask may be a linear grating. The mask may also be a circular mask containing a spiral grating. In this latter case the pattern is conveniently projected onto the specimen by illuminating the specimen through a portion of the grating located towards or at the edge of the circular mask; for in this portion, the spiral grating approximates to a grating of parallel lines. An advantage of this spiral grating is that continuous movement of the grating is achieved by rotation of the mask. Alternatively, where a coherent light source is employed, the patterning means may be provided by a second coherent light source so arranged to interfere with the light from the first light source.

In a further aspect, the present invention provides apparatus adapted to modify a conventional microscope, comprising patterning means for generating a substantially periodic spatial pattern, phase shift means for adjusting the spatial phase of the pattern and an analyzer having means for analysing images of a specimen on which the spatial pattern has been generated, the spatial phase shift of the pattern being different in at least three images, and means for removing the spatial pattern from the three images thereby to generate an optically sectioned image of the specimen.

In a further embodiment, the present invention provides a method of adapting a conventional microscope to produce optically sectioned images of a specimen, the method comprises introducing patterning means into the optical system of the microscope for generating a substantially periodic spatial pattern on the specimen; providing spatial phase shift means for adjusting the spatial phase of the pattern to produce at least three different spatially phase shifted patterns on the specimen; and providing an analyzer having means for analysing at least three separate images of the specimen, each with a different spatial phase shift of the pattern, and means for removing the spatial pattern from the images of the specimen thereby to generate optically sectioned image of the specimen.

It is thus an advantage of the present invention that a conventional microscope, a ubiquitous piece of laboratory equipment, may readily be converted so as to be capable of providing optically sectioned images.

The present invention also provides a method of processing image data of at least three images of the same specimen, the images having a substantially periodic pattern superimposed thereon, the spatial phases of the pattern on three images being different, comprising analysing the data so as to generate a composite, from said image, free of the pattern.

BRIEF DESCRIPTION OF THE FIGURES

Embodiments of the present invention will now be described by way of example with reference to the accompanying drawings in which.

DETAILED DESCRIPTION OF THE PREFERRED EMBODIMENTS

Figure 1:
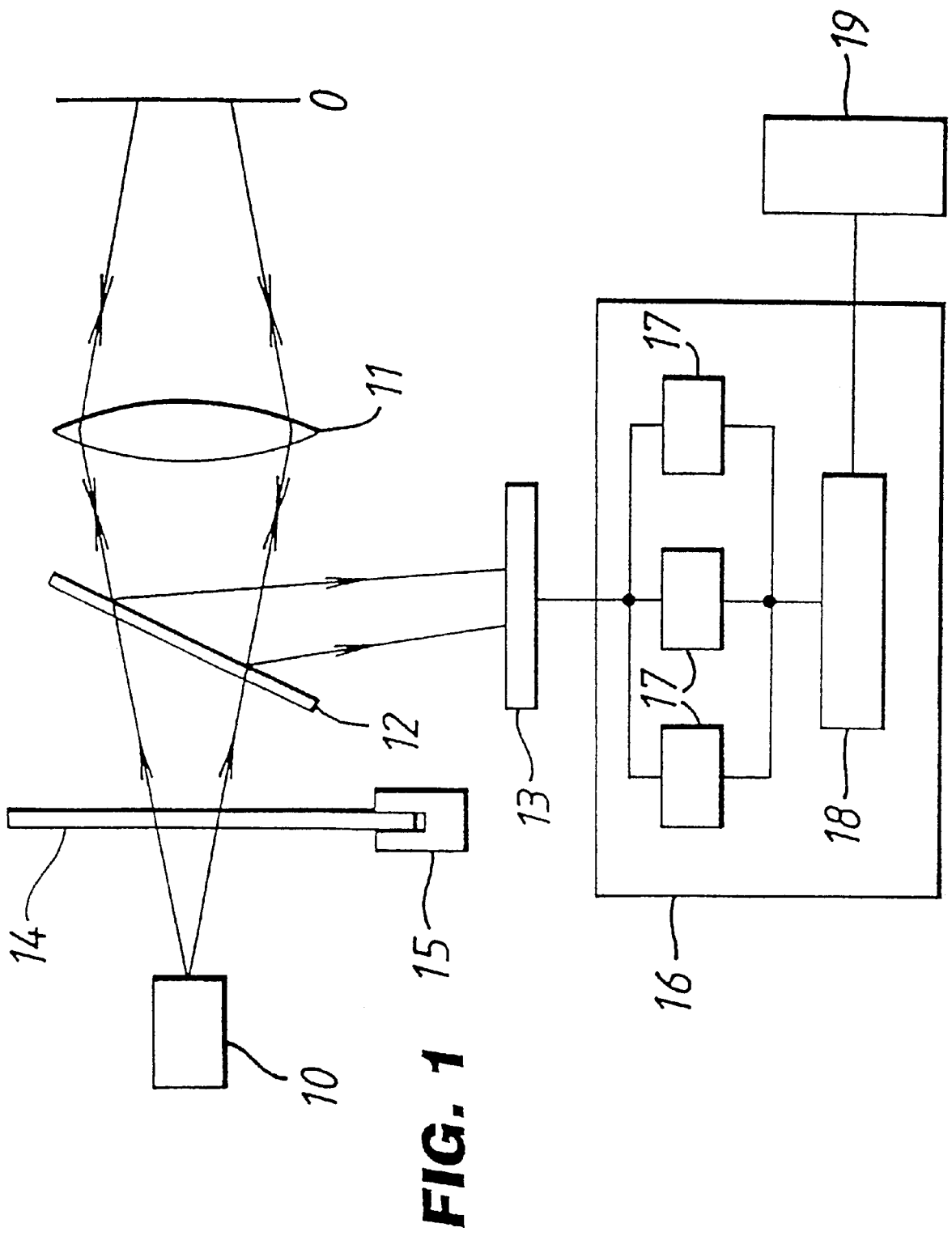
FIG. 1 is a schematic diagram of microscopy imaging apparatus in accordance with the present invention.

The imaging apparatus shown in FIG. 1 has many of the features of a conventional microscope and in particular includes an incoherent light source 10, focusing means preferably in the form of one or more lens 11 which focuses light from the light source 10 onto the object to be imaged O. A beam-splitter 12 is located between the light source and the object so the light reflected from the object is reflected towards a light detector 13 preferably in the form of a CCD camera. In addition, the apparatus includes a mask 14 which is patterned, for example in the form of a grating, and which is provided with the light source 10 so that the object is illuminated with a non-zero, spatially substantially periodic pattern. The mask pattern is thus projected onto the specimen. Preferably, the mask pattern has local periodicity in only one dimension. The detector plane is conjugate to the plane in which the projected pattern is focused to enable an optically sectioned image of the object to be formed.

The apparatus further includes spatial phase shift means 15 for adjusting the spatial phase of the mask pattern focused on the object such that at least three different phases of the mask pattern are generated. The phase shift means 15 may be in the form of a carriage for moving the mask either incrementally or continuously relative to the object so that the spatial phase of the patterned light focused on the object can be altered. In the case of a mask which is in the form of linear grating, the carriage is arranged to move the grating perpendicular to the axis of the imaging apparatus. Another option for adjusting the spatial phase includes movement of the beam splitter so as to shift the phase of the projected pattern.

The pattern can be generated on the specimen in different ways. The pattern is optionally generated by employing a ribbon belt carrying a pattern, for example parallel stripes. Here, a light source projects the pattern of the ribbon onto the specimen. The ribbon forms a loop around the light source so that the light only shines through that part of the ribbon that is situated between the light source and the object. Alternatively, the ribbon forms a loop around the specimen.

Another option is that the ribbon forms a loop around a mirror, one part of the ribbon being situated between the light source and the mirror. The light that has passed through the ribbon would then be reflected onto the specimen by means of the mirror. Such a ribbon can thus be moved continuously or incrementally in the same direction at all times. It offers the advantage of generating a pattern of, for example, exactly parallel stripes (as does a mask comprising a rectangular panel) without the necessity of moving it in a sawtooth fashion or reversing the direction of movement.

In FIG. 1 the phase shift means 15 is in the form of a carriage which is arranged to move the mask 14 to three predetermined positions located in a plane perpendicular to the axis of the imaging apparatus (into and out of the page). The three positions for the carriage are chosen so that three different spatial phases of the mask are focused on the object. For example, the three phases may be: $\phi$, $\phi+120°$ and $\phi+240°$. Alternative spatial phase shifts may be generated, for example: $\phi$, $\phi+90°$, $\phi+180°$ and $\phi+270°$. With each of the two examples given above the angular difference between the individual spatial phases is the same, however is not essential for the angular difference to be the same, i.e spatial phase shifts of $\phi$, $\phi+90°$ and $\phi+270°$ may also be used.

The imaging apparatus further includes an analyzer 16 connected to the detector which analyses the output of the detector. The analyzer 16 may include memory means 17, for example in the form of plurality of buffers, which separately store the three or more images of the object each illuminated with different phases of the mask. The analyzer 16 further includes pattern removal means 18 for analysing the three or more stored images so as to remove the mask pattern from the images thereby revealing an optically sectioned image of the object. 3-D imaging means 19 is conveniently provided which employs standard rendering techniques to generate a three-dimensional image of the object through combining a plurality of different optically sectioned images, generated by the pattern removal means 18, at different focal positions.

The pattern removal means 18 may operate to determine directly the in-focus image minus the fringing. For example, where three images are $I_1, I_2, I_3$, generated at three equally spaced spatial phases the in-focus image, I, can be determined by using the following equation:

$$I=\sqrt{(I_1-I_2)^2+(I_1-I_3)^2+(I_2-I_3)^2}$$

Implementing this procedure for each pixel of the image is, however, computationally intensive. Alternatively, to enable real-time imaging to be performed without the need for dedicated image processing apparatus, the analyzer 16 may include a look-up table connected to the pattern removal means 18. The look-up table is a tabulation of all possible solutions to the above equation with respect to the three input image values and enables the image I to be determined by reference to the table rather than through calculation of the solution of the equation for each pixel.

The imaging apparatus described above takes advantage of the fact that any non-zero spatial frequency in the image of the object attenuates as the apparatus is defocused. This means that the mask pattern is only imaged well on those parts of the object which are in focus and thus provides a means of sectioning those parts of the object, which are in focus, albeit with an undesirable fringe pattern superimposed. By recording three or more images of the object at the same focal position but with different superimposed spatial phases of the pattern it is possible for the images to be analyzed to remove the superimposed patterns to reveal an optically sectioned image of the object.

Preferably, the mask 14 is in the form of a linear grating that is a square wave pattern, since this gives greatest light throughput. Alternating transparent and non-transparent bands of equal width are suitable. A pattern of wider bands results in a deeper optical section. Good results have been obtained using bands of width 5–30 microns, 12½ microns in particular, though different widths will be appropriate according to the optical sectioning required. However, any applied substantially periodic light intensity pattern may be employed. Suitable alternative masks include a spiral grating. Moreover, two dimensional periodic patterns may also be used but naturally the analysis of the resultant images is somewhat complicated.

As the pattern spacing determines the depth of the optical sectioning, ideally the pattern spacing (spatial periodicity) of the mask is selected and the illumination magnification is arranged so that only the fundamental of the pattern is projected onto the object. In the case of the linear square wave grating described above where the three phases of the grating $\phi$, $\phi+120°$ and $\phi+240°$ are projected onto the object, the third harmonic is automatically cancelled out in the subsequent processing of the three images and so it is not essential to avoid the third harmonic being projected on to the object. This provides greater freedom in the overall design of the imaging system and improves the light budget of the apparatus. In general, where the difference between the n phase shifts of the pattern projected onto the object is the same in each case the $n^{th}$ harmonic and harmonics thereof are automatically cancelled out.

Imaging apparatus has been described above in which three or more discrete predetermined phase shifts of the pattern are projected onto the object. Where the spatial phase of the pattern is varied continuously, for example using a rotating spiral mask or continuous movement of a grid-type mask, the images of the object are integrated over predetermined time periods to generate the optically sectioned image.

The imaging apparatus may alternatively employ a coherent light source. This in turn permits the mask to have intensity or phase patterning. The use of period phase patterning is preferred as the light budget of the apparatus is greater than in the case of periodic intensity patterning. In a further alternative, two coherent light beams may be employed which are arranged so that the light from the two sources interfere to generate a fringe pattern in the object volume. Where two coherent light beams are used the temporal phase difference between the two beams may be altered to effect the required spatial phase shifts of the fringe pattern. Where one or more coherent light sources are used, the fringe pattern extends in depth through the object volume hence exact axial alignment of the detection plane is no longer critical. This approach is particularly appropriate for fluorescence imaging.

The optical system of a specific embodiment of the present invention simply consists of an illumination mask, $S(t_O, w_O)$ which is imaged onto an object of amplitude transmittance or reflectance, $\tau(t_1, w_1)$. The final image is recorded by a CCD camera in the image plane (t,w). The mask is illuminated incoherently which permits us to write the image intensity as $$I(t,w) = \int\int S(t_0,w_0) |\int\int h_1(t_0+t_1,w_0+w_1)\tau(t_1,w_1)h_2(t_1+t,w_1+w)dt_1dw_1|^2 dt_0 dw_0 \quad (1)$$

where $h_{1,2}$ represents the amplitude point spread functions of the two lenses. We also elect to work in optical co-ordinates (t,w) which are related to real co-ordinates (x,y) via $$(t, w) = 2\frac{\pi}{\lambda}(x, y)n\sin\alpha$$

where $n \sin \alpha$ is the numerical aperture (NA) and $\lambda$ denotes the wavelength.

We now assume that the illumination mask takes the form of a one-dimensional grid which we may write for simplicity as $$S(t_0,w_0) = 1 + m \cos(\overline{\nu}t_0 + \phi_0) \quad (2)$$

where m denotes a modulation depth and $\phi_O$ an arbitrary spatial phase. The normalised spatial frequency $\overline{\nu}$ is related to the actually spatial frequency $\nu$ via $\overline{\nu} = \beta\lambda\nu/NA$ where $\beta$ denotes the magnification between the grid plane and the specimen plane. If we now substitute equation (2) into equation (1) we have $$I(t,w) = I_0 + I_C \cos\phi_0 + I_S \sin\phi_0 \quad (3)$$

where $I_O$ is given by equation (1) with S=1 and, of course, represents a conventional wide field image. $I_c$ and $I_s$ represent the image due to masks of the form $m\cos(\overline{\nu}t_0)$ and $m\sin(\overline{\nu}t_0)$ respectively. If we now form $I_p = \sqrt{I_C^2 + I_S^2}$ we remove the grid pattern from the image of the specimen. This is achieved by taking three images, $I_1, I_2$ and $I_3$ corresponding to the relative spatial phases $\phi_0=0$, $\phi_0=2\pi/3$ and $\phi_0=4\pi/3$ respectively. We thus obtain an optically sectioned image, which does not contain $I_O$, by calculating $$I_P = \sqrt{(I_1-I_2)^2 + (I_1-I_3)^2 + (I_2-I_3)^2}$$

The method is analogous to square law detection in communications systems, and can be described also as grouping the recorded images into pairs of images and calculating the square root of the sum of the squares of the differences between the recorded images in each pair of images.

Figure 2:
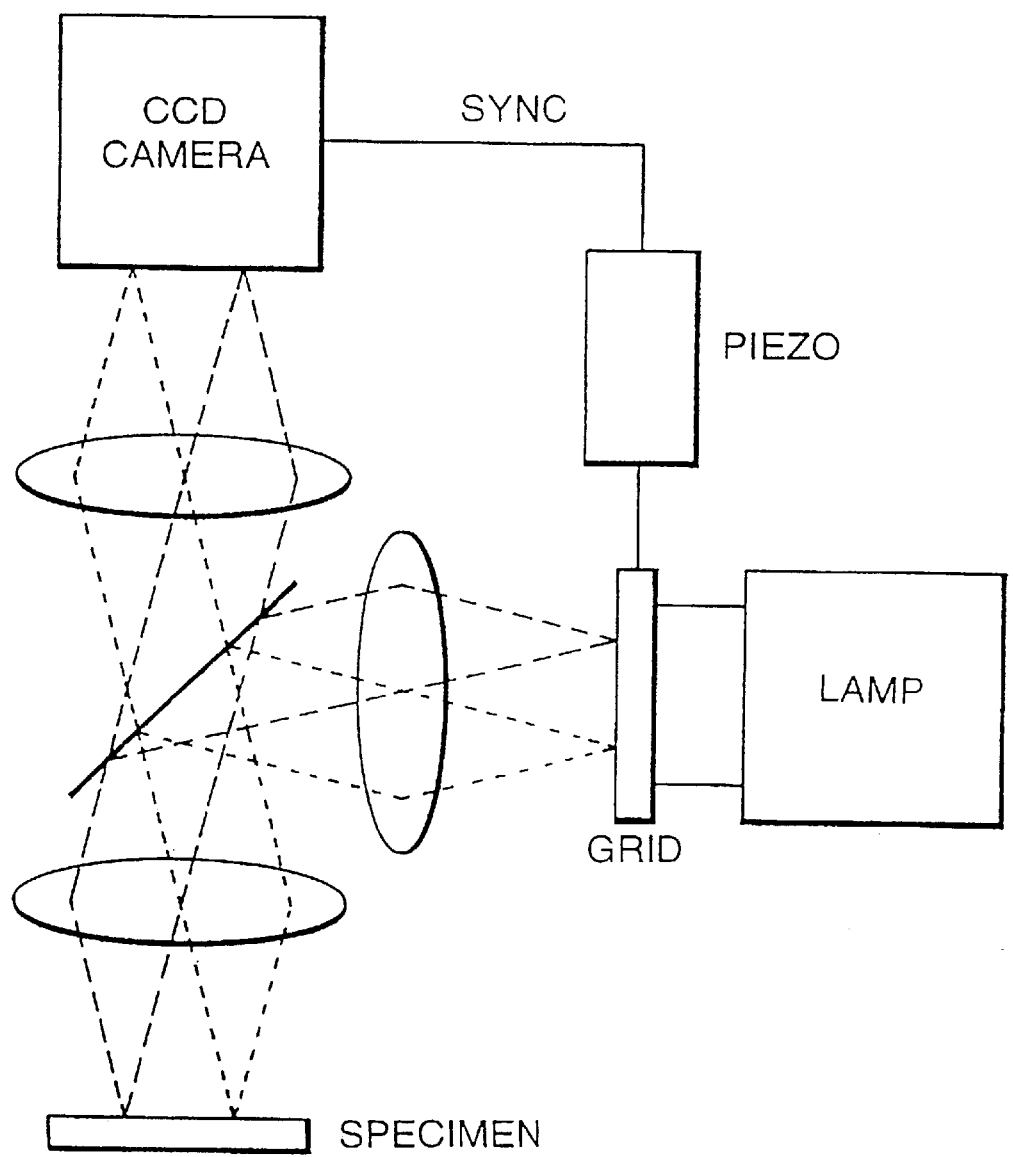
FIG. 2 is a schematic diagram of an optical system of the present invention.

In order to demonstrate the ability of our system to produce optically sectioned images in real time we introduced a 40 lines/mm one dimensional grid into the illumination path of a conventional microscope. Since we used infinity tube lengths optics it was necessary to introduce separate lenses both to project the image of the grid onto the specimen and to image the specimen onto the CCD camera. This resulted in an effective magnification between the illumination plane and the specimen of (50/180)M where M is the nominal magnification of the objective lens. A 15W tungsten-halogen lamp was used at the light source together with a green filter (bandwidth 100 nm). Images were recorded with a CCD camera and transferred to a Matrox Meteor frame grabber. The grid was moved in a simple saw tooth fashion synchronised to the camera frame rate such that any three successive camera images correspond to a spatial shift of one third of a period in the position of the projected image of the grid, FIG. 2. The fact that the grid is in motion during the integration time of each frame results in a reduction in the valves of $I_c$ and $I_s$ in equation (3) by a factor of sinc ($\pi t/3T$) where t is the integration of the camera and T the time between the recording of successive frames. In our case T=2t=40 ms and hence this factor is only 0.955. In the worst case, T=t, the factor falls to only 0.827. The optically sectioned images were obtained using equation (4) together with a look up table which mapped all possible combinations of $I_1, I_2$ and $I_3$ from our 8 bit camera to $I_p$.

Figure 3:
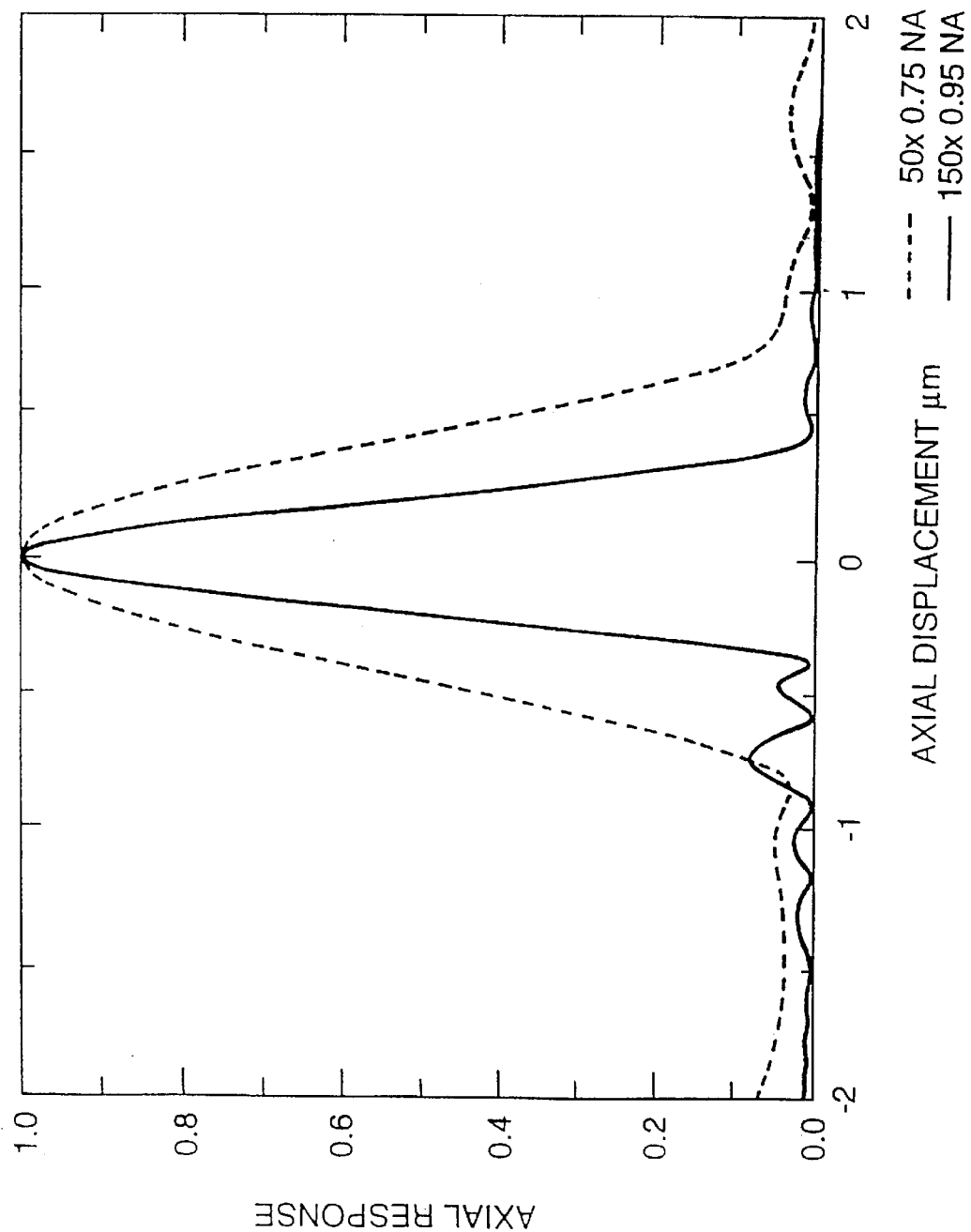
FIG. 3 shows measured axial responses of the system of FIG. 2.

In order to measure the optical sectioning strength of our microscope we used a plane mirror together with a calibrated axial translation stage; the resulting axial responses are shown in FIG. 3 for two Olympus MD Plan objectives. We note that the use of the 50×0.75 NA corresponds to v=0.4 in our system for which we predict a full width half maximum (FWHM) of 0.87 μm which compares well with the measured value of 0.91 μm. Theory predicts that the 150×, 0.95NA dry objective should give a v=0.8 and hence a FWHM of 0.27 μm. In practice we measure 0.43 μm which corresponds to a numerical aperture of this lens is 0.85 rather than 0.95. This discrepancy is consistent with other measurements performed with high aperture lenses and may be due to a variety of causes one of which is likely to be the strong attenuation of the marginal rays which leads to an effective apodisation of the pupil function.

Figure 4A:
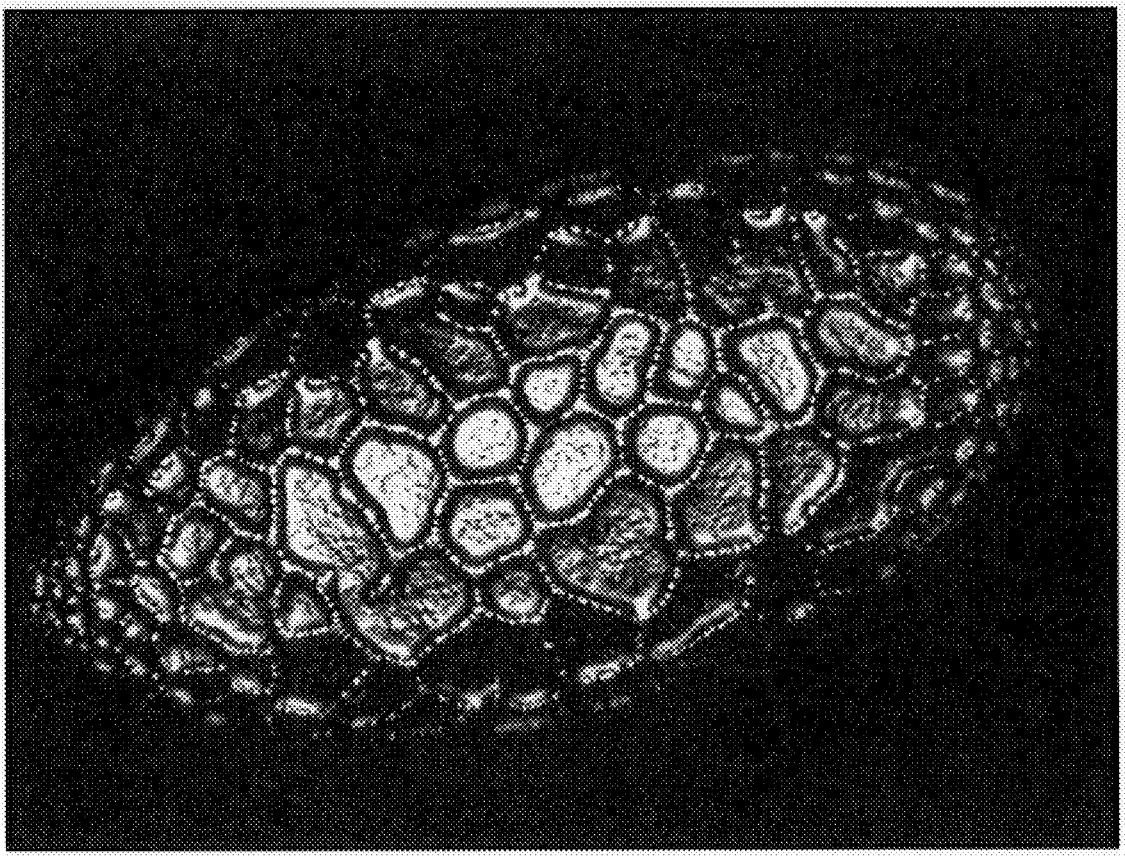
FIG. 4(a) shows an autofocus image of a lily pollen grain (field size is 100 $\mu$m×70 $\mu$m) obtained according to the present invention.
Figure 4B:
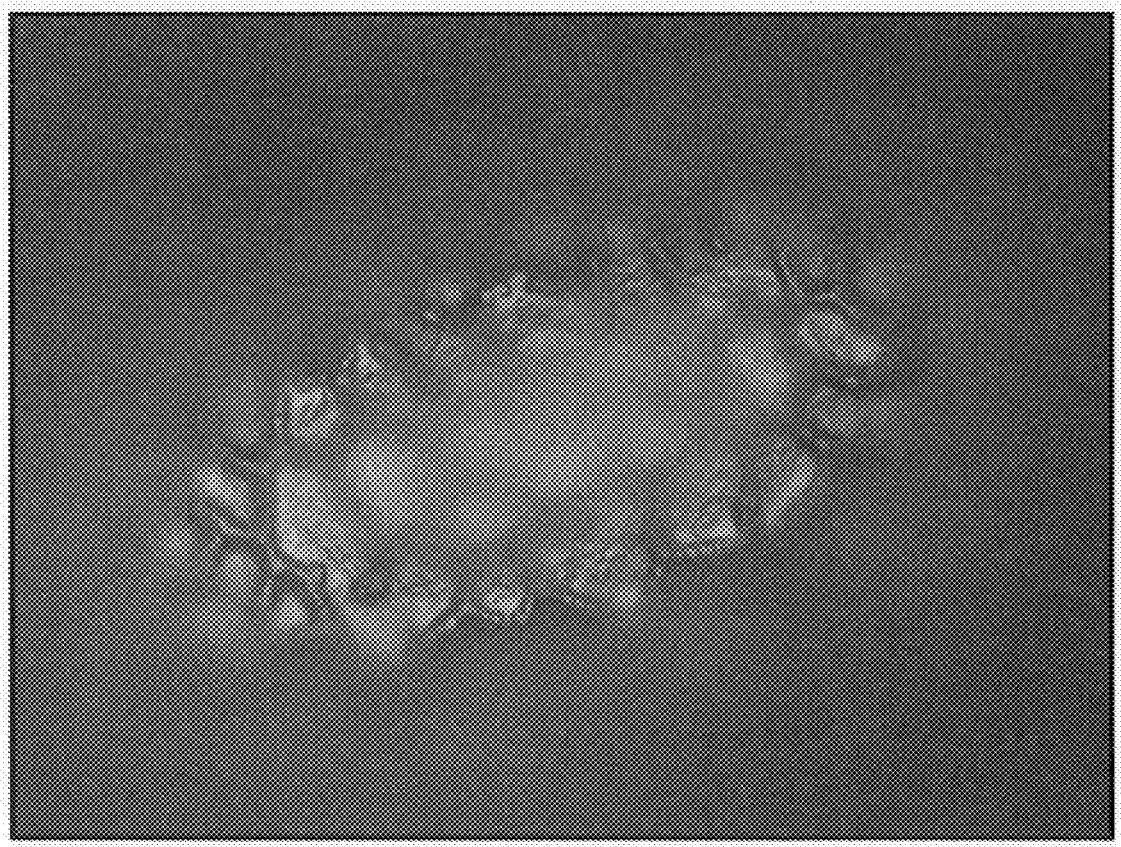
FIG. 4(b) shows a conventional image of a lily pollen grain (not according to the present invention) when the microscope is focused in a mid-depth plane.

In FIG. 4 we show images by imaging the thick volume structure of a lily pollen grain. FIG. 4(a) represents an autofocus image obtained by displaying the maximum image intensity at each pixel throughout a 30 μm axial scan according to the present invention using the 50×, 0.75 NA objective lens. The full surface texture of the grain is well resolved over the entire image volume. FIG. 4(b), on the other hand shows a conventional image taken at a plane midway through the grain. It is clear that a good deal of out-of-focus blur is present here which prevents any meaningful three-dimensional image processing being carried out.

It will be apparent that a conventional microscope may be easily modified so as to generate optically sectioned images. The modification consists of introducing the patterned mask and carriage into the illumination system of the microscope and the addition of the analyzer, described above. The introduction of the mask and carriage may in turn require the introduction of additional optics, however, where the conventional microscope includes an iris focused on the object, the iris may simply be replaced by the mask and carriage without further alteration.

The imaging apparatus described above may be employed in a wide range of imaging modalities including, for example, darkfield and differential interference contrast. Also, the imaging apparatus may be used in all conventional microscopy applications. In particular the apparatus may be used in biomedical applications and has the advantage that optically sectioned fluorescent imaging may be performed efficiently without the need for a laser as the light source.

What is claimed is:

1. A method of generating an image of a specimen comprising the steps of illuminating the specimen with a light source; generating a substantially periodic spatial pattern on the specimen; recording a first image of the specimen; altering the spatial phase of the pattern on the specimen and recording a second image of the specimen; repeating at least once more the steps of altering the spatial phase of the pattern on the specimen and recording a third image of the specimen, the spatial phase of the pattern in at least three recorded images of the specimen being different; and grouping the recorded images into pairs of images and calculating the square root of the sum of the squares of the differences between the recorded images in each pair of images, thereby to remove the spatial pattern and obtain an in-focus image.

2. A method according to claim 1 comprising using a mask to project the pattern onto the specimen.

3. A method according to claim 2 wherein said step of altering the spatial phase of the pattern comprises moving said mask.

4. A method according to claim 2 wherein said step of altering the spatial phase of the pattern comprises moving said mask in a direction in which a periodicity can be found.

5. A method according to claim 1 wherein the spatial phases of three recorded images are $\phi_o$, $\phi_o+120°$ and $\phi_o+240°$ respectively, $\phi_o$ being an arbitrary phase.

6. A method according to claim 1 comprising substantially continuously altering the spatial phase of the pattern.

7. A method according to claim 1 comprising substantially incrementally altering the spatial phase of the pattern.

8. A method according to claim 1, wherein an in-focus image is obtained using the formula:

$$I = \sqrt{\sum_{n,m}(I_n - I_m)^2}$$

wherein the recorded images are $I_{n,m}$ and the in-focus image is I.

9. A method according to claim 1, wherein an in-focus image is obtained using the formula:

$$I=\sqrt{(I_1-I_2)^2+(I_1-I_3)^2+(I_2-I_3)^2}$$

wherein three recorded images are $I_1$, $I_2$, $I_3$ and the in-focus image is I.

10. A method of processing image data of at least three images of the same specimen, the images having a substantially periodic pattern superimposed thereon, the spatial phases of the pattern on three images being different, comprising analysing the data so as to generate a composite image, free of the pattern.

11. A method according to claim 10 wherein the pattern has local periodicity in only one direction.

12. Microscopy imaging apparatus comprising a light source; patterning means for generating a substantially periodic spatial pattern; focusing means for focusing light from the light source on a specimen and generating the pattern on the specimen; phase shift means for adjusting the spatial phase of the pattern generated on the specimen; a detector for detecting images of the specimen; and an analyzer having means for analysing at least three images of the specimen, the spatial phase shift of the pattern being different in the at least three images, and pattern removal means for removing the spatial pattern from the three images of the specimen thereby to generate an optically sectioned image of the specimen, wherein said pattern removal means groups the recorded images into pairs of images and calculates the square root of the sum of the squares of the differences between the recorded images in each pair of images, thereby removing the spatial pattern and obtaining an in-focus image.

13. Apparatus according to claim 12 wherein said patterning means comprises a mask, and means for projecting the pattern onto the specimen.

14. Apparatus according to claim 13 wherein said phase shift means is adapted to move said mask.

15. Apparatus according to claim 13 wherein said phase shift means is adapted to move said mask in a direction in which periodicity can be found.

16. Apparatus according to claim 12 wherein said phase shift means is adapted to shift the phase of the pattern in a substantially continuous way.

17. Apparatus according to claim 12 wherein said phase shift means is adapted to shift the phase of the pattern in a substantially incremental way.

18. Apparatus according to claim 12 comprising a detector for detecting fluorescence images of said specimen.

19. Apparatus adapted to modify a conventional microscope into apparatus according to claim 12, comprising patterning means for generating a substantially periodic spatial pattern, phase shift means for adjusting the spatial phase of the pattern and an analyzer having means for analysing images of a specimen on which the spatial pattern has been generated, the spatial phase shift of the pattern being different in at least three images, and pattern removal means for removing the spatial pattern from the three images thereby to generate an optically sectioned image of the specimen.

20. A method of adapting a conventional microscope to produce optically sectioned images of a specimen, comprising the steps of introducing patterning means into the optical system of the microscope for generating a substantially periodic spatial pattern on the specimen; providing spatial phase shift means for adjusting the spatial phase of the pattern to produce at least three different spatially phase shifted patterns on the specimen; and providing an analyzer having means for analysing at least three separate images of the specimen, each with a different spatial phase shift of the pattern, and pattern removal means for removing the spatial pattern from the images of the specimen thereby to generate optically sectioned image of the specimen, wherein said pattern removal means groups the recorded images into pairs of images and calculates the square root of the sum of the squares of the differences between the recorded images in each pair of images, thereby removing the spatial pattern and obtaining an in-focus image.

* * * * *

UNITED STATES PATENT AND TRADEMARK OFFICE
CERTIFICATE OF CORRECTION

PATENT NO.   : 6,376,818 B1                                     Page 1 of 1
DATED        : April 23, 2002
INVENTOR(S)  : Wilson et al.

It is certified that error appears in the above-identified patent and that said Letters Patent is hereby corrected as shown below:

<u>Title page,</u>
Item [30]:

-- [30]  Foreign Application Priority Data
Apr. 4, 1997     (GB) ...................... 9706843.1
Dec. 15, 1997    (GB) ...................... 9726485.7 --

Signed and Sealed this

Twenty-fourth Day of September, 2002

*Attest:*

*Attesting Officer*

JAMES E. ROGAN
*Director of the United States Patent and Trademark Office*